United States Patent
Frost et al.

(10) Patent No.: US 11,556,650 B2
(45) Date of Patent: Jan. 17, 2023

(54) METHODS AND SYSTEMS FOR PREVENTING UTILIZATION OF PROBLEMATIC SOFTWARE

(71) Applicant: INTERNATIONAL BUSINESS MACHINES CORPORATION, Armonk, NY (US)

(72) Inventors: Keith Frost, Delaware, OH (US); Stephen Boxwell, Franklin, OH (US); Stanley Vernier, Grove City, OH (US); Kyle Brake, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 16/399,291

(22) Filed: Apr. 30, 2019

(65) Prior Publication Data

US 2020/0349258 A1 Nov. 5, 2020

(51) Int. Cl.
G06F 21/57 (2013.01)
G06N 5/02 (2006.01)
G06F 40/40 (2020.01)

(52) U.S. Cl.
CPC .............. *G06F 21/57* (2013.01); *G06N 5/02* (2013.01); *G06F 40/40* (2020.01); *G06F 2221/033* (2013.01)

(58) Field of Classification Search
None
See application file for complete search history.

(56) References Cited

U.S. PATENT DOCUMENTS

| 7,725,735 | B2 | 5/2010 | Fox et al. | |
| 8,443,449 | B1* | 5/2013 | Fan | G06F 21/564 |
| | | | | 713/188 |
| 8,499,063 | B1* | 7/2013 | Satish | G06F 8/62 |
| | | | | 709/224 |
| 8,505,102 | B1* | 8/2013 | Cannings | H04L 63/145 |
| | | | | 713/188 |
| 9,038,054 | B1 | 5/2015 | Kozak | |
| 10,057,291 | B1* | 8/2018 | Glotzer | H04L 63/1441 |
| 10,382,476 | B1* | 8/2019 | Li | H04L 63/10 |
| 10,817,283 | B1* | 10/2020 | Naik | G06F 11/3612 |
| 2007/0006161 | A1* | 1/2007 | Kuester | G06Q 10/06 |
| | | | | 717/121 |
| 2007/0033635 | A1* | 2/2007 | Hirsave | G06F 21/577 |
| | | | | 726/1 |
| 2010/0145748 | A1* | 6/2010 | Mayle | G06Q 10/06 |
| | | | | 705/7.13 |
| 2010/0305994 | A1* | 12/2010 | Gaskell | G06Q 10/067 |
| | | | | 705/348 |
| 2012/0030731 | A1 | 2/2012 | Bhargava et al. | |

(Continued)

FOREIGN PATENT DOCUMENTS

| CN | 102984140 A | 3/2013 |
| EP | 3131014 A1 | 2/2017 |
| EP | 3282363 A1 | 2/2018 |

*Primary Examiner* — Michael Pyzocha
(74) *Attorney, Agent, or Firm* — Griffiths & Seaton PLLC

(57) ABSTRACT

Embodiments for managing the utilization of software releases are provided. Information associated with a software release and at least one early adopter of the software release is analyzed to calculate a severity score for the software release. A time to utilize the software release is determined based on the calculated severity score.

21 Claims, 5 Drawing Sheets

(56) References Cited

U.S. PATENT DOCUMENTS

| | | | |
|---|---|---|---|
| 2013/0246849 A1* | 9/2013 | Plamondon | G06F 11/3688 714/E11.178 |
| 2014/0189829 A1* | 7/2014 | McLachlan | G06Q 20/4014 726/6 |
| 2014/0317591 A1* | 10/2014 | Rosomoff | G06F 8/30 717/101 |
| 2015/0347970 A1* | 12/2015 | Kirtane | G06F 11/3664 717/103 |
| 2016/0179498 A1* | 6/2016 | Das | G06F 8/65 717/171 |
| 2017/0177324 A1 | 6/2017 | Frank et al. | |
| 2017/0200006 A1* | 7/2017 | Gershoni | G06F 21/552 |
| 2017/0213037 A1* | 7/2017 | Toledano | H04L 63/06 |
| 2018/0165085 A1* | 6/2018 | Carter | G06F 8/60 |
| 2018/0307480 A1* | 10/2018 | Doyle | G06F 8/658 |
| 2018/0341865 A1* | 11/2018 | Lu | G06F 8/61 |
| 2020/0019393 A1* | 1/2020 | Vichare | G06F 8/60 |
| 2020/0034133 A1* | 1/2020 | Dattatri | G06F 8/61 |
| 2020/0134195 A1* | 4/2020 | Youngberg | G06F 21/563 |
| 2020/0174774 A1* | 6/2020 | Natarajan | G06F 8/65 |
| 2020/0310769 A1* | 10/2020 | Veljanoski | G06N 20/00 |
| 2020/0334133 A1* | 10/2020 | Tsirkin | G06F 11/3037 |

\* cited by examiner

METHODS AND SYSTEMS FOR PREVENTING UTILIZATION OF PROBLEMATIC SOFTWARE

BACKGROUND OF THE INVENTION

Field of the Invention

The present invention relates in general to computing systems, and more particularly, to various embodiments for preventing problems associated with utilizing new software releases.

Description of the Related Art

In the field of software (and/or software development), it has become increasingly important to update software promptly to, for example, correct security flaws and to take advantage of the most recent features. For this reason, some software management systems, such as dependency management software, is often configured to automatically acquire the most recent version of a dependency (or other software release), sometimes subject to restrictions on the major and minor version. This practice reduces or eliminates the tedious work of manually incrementing the version number of a dependency every time a library is updated.

However, in the event that a release accidentally or maliciously introduces a critical flaw or virus, this practice may allow malicious code to spread rapidly without human intervention. Even if the suspicious functionality is identified and reported promptly, it may take time for a development team to respond with a corrected version or retract the offending artifacts.

SUMMARY OF THE INVENTION

Various embodiments for managing the utilization of software releases in a computing environment are provided. Information associated with a software release and at least one early adopter of the software release is analyzed to calculate a severity score for the software release. A time to utilize the software release is determined based on the calculated severity score.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
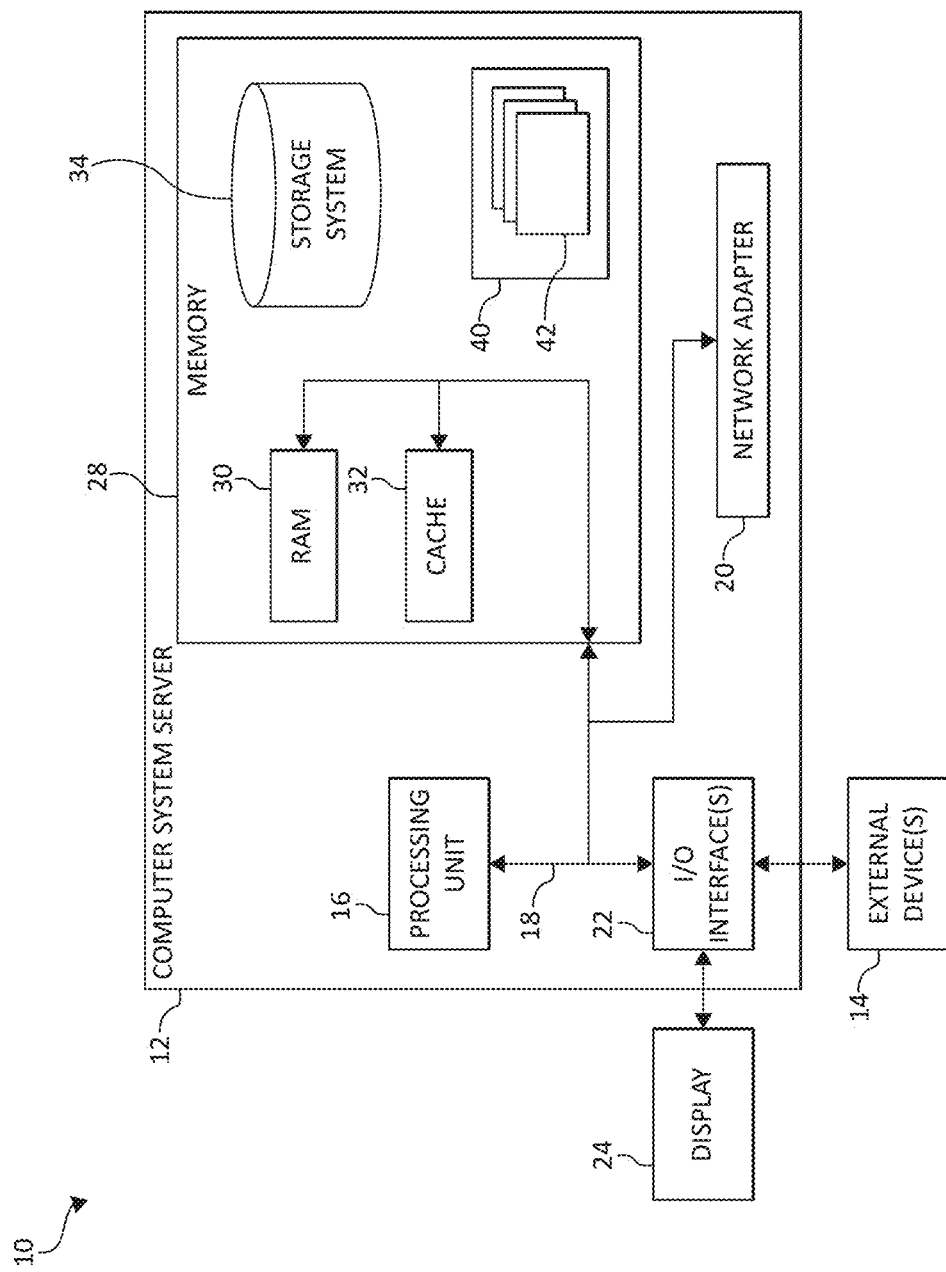
FIG. 1 is a block diagram depicting an exemplary computing node according to an embodiment of the present invention.

As discussed above, in the field of software (and/or software development), it has become increasingly important to update software promptly to, for example, correct security flaws and to take advantage of the most recent features. For this reason, some software management systems, such as dependency management software, is often configured to automatically acquire the most recent version of a dependency (or other software release or update), sometimes subject to restrictions on the major and minor version. This practice reduces or eliminates the tedious work of manually incrementing the version number of a dependency every time a library is updated.

However, in the event that a release accidentally or maliciously introduces a critical flaw or virus, this practice may allow malicious code to spread rapidly without human intervention. Even if the suspicious functionality is identified and reported promptly, it may take time for a development team to respond with a corrected version or retract the offending artifacts.

For example, consider a scenario in which a software release (e.g., a dependency update), such as "dependency D version 1.2.3," is published (or released, made available, etc.) on a particular day at a particular time in the central United States (e.g., Monday at 6 P.M. local time). Ten hours later, a user (e.g., an early adopter, test user, etc.) in South Korea notices suspicious network activity transmitting credentials to an unknown website and traces it to the recent dependency update. Thirty minutes later, the user opens a strongly worded issue or thread on a web-based issue reporting page associated with the dependency update (e.g., the location of which is available in the metadata of D). At 6 P.M. the next day (e.g., in the central United States), a schedule automated build of software product P begins, which pulls (or utilizes) the most recent version of D (e.g., version 1.2.3) (e.g., via dependency management software). Approximately one our later, the developers of D begin to investigate the issue as reported on the web-based issue reporting page. After another hour has passed, the developers realize that a security breach has indeed occurred and begin the process to unpublish release 1.2.3. One hour later, the internally-used credentials of product P are transmitted across the internet by the malicious code inside D, v 1.2.3.

In such a situation, although an early adopter of the latest software release (or update) provided feedback regarding the issue before the software release was utilized in a manner that led to undesirable consequences, the dependency management software automatically utilized the latest version of the software which led to the consequences occurring anyway.

To address these needs and/or the shortcomings in the prior art, in some embodiments described herein, methods and/or systems are disclosed that provide for automated monitoring and analysis of, for example, feedback provided by early adopters of software releases via online channels. Depending on the apparent severity of the issues raised in the feedback, utilization of the software release (e.g., dependency update) may be delayed (or entirely prevented), allowing time for a manual response (e.g., by appropriate personnel). The systems and methods described herein may be utilized by and/or integrated within, for example, software management systems (or tools), such as dependency management software.

For example, in some embodiments, the systems (and/or methods) described herein utilize a cognitive analysis performed on content (e.g., feedback, commentary, etc.) generated by early adopters of software releases (or updates, versions, patches, etc.), which is associated with the software releases. The cognitive analysis may include (and/or be performed utilizing) natural language processing to understand, classify, etc. the content.

For example, natural language processing techniques (e.g., a NLP topic model) may be utilized to automatically track designated reporting fora (e.g., an online forum, issue reporting website/webpage, etc.) to delay the incorporation of dependencies (or other software releases) until they have been vetted by early adopters. That is, if a dependency is detected as having issues, as indicated by feedback (or other commentary, communications, etc.) left by early adopters, the utilization of the dependency may be at least delayed for some time (e.g., a few days), giving the developers time to correct the problem(s).

The processes described herein may utilize various information or data sources associated with software releases, users (e.g., early adopters), and/or the content (e.g., feedback provided by users). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profiles may be utilized to determine the severity of the issues raised by the users (i.e., if any) with respect to the software releases. That is, the information provided by the early adopters may be weighted based on their cognitive profiles (e.g., information received from an early adopter with a cognitive profile that indicates a relatively high level of experience and/or expertise may be weighted more than that of an early adopter with a cognitive profile that indicates a lower level of experience/expertise).

As mentioned above, in some embodiments, the methods and systems described herein utilize a cognitive analysis that is performed on the available data sources and/or content. The cognitive analysis may (also) include classifying natural language, analyzing tone, and analyzing sentiment (e.g., scanning for keywords, key phrases, etc.) with respect to, for example, content and communications sent to and/or received by users, and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. Over time, the methods and systems described herein may determine correlations (or insights) between content (e.g., feedback left by early adopters) and issues with software releases, which may be used to determine or calculate a severity score for and/or a time to utilize software releases. Feedback received from (or provided by) users (e.g., early adopters or later users of the software) and/or administrators may be utilized, which may allow for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of software releases as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing the utilization of software releases is provided. Information associated with a software release and at least one early adopter of the software release is analyzed to calculate a severity score for the software release. A time to utilize the software release is determined based on the calculated severity score.

The determining of the time to utilize the software release may include preventing the software release from being utilized if the calculated severity score exceeds a predetermined threshold. The software release may be caused to be utilized at the determined time.

The determining of the time to utilize the software release may include multiplying the calculated severity score by a configurable tuning factor. The information associated with the software release and the at least one early adopter of the software release may include feedback provided by the at least one early adopter on (or via) an online channel.

The analyzing of the information associated with the software release and the at least one early adopter may be performed utilizing a cognitive analysis. The analyzing of the information associated with the software release and the at least one early adopter may be performed utilizing a natural language processing technique.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
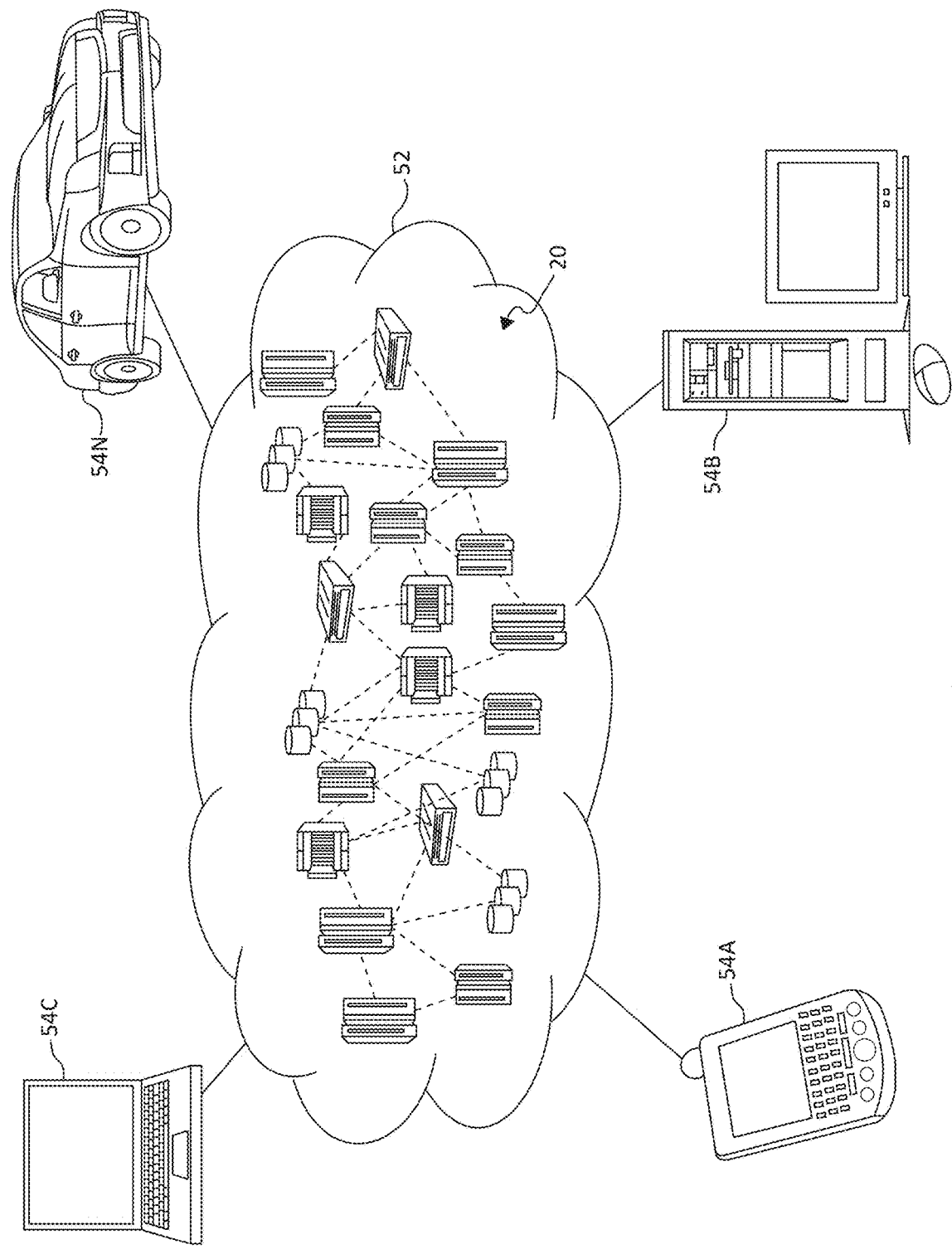
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
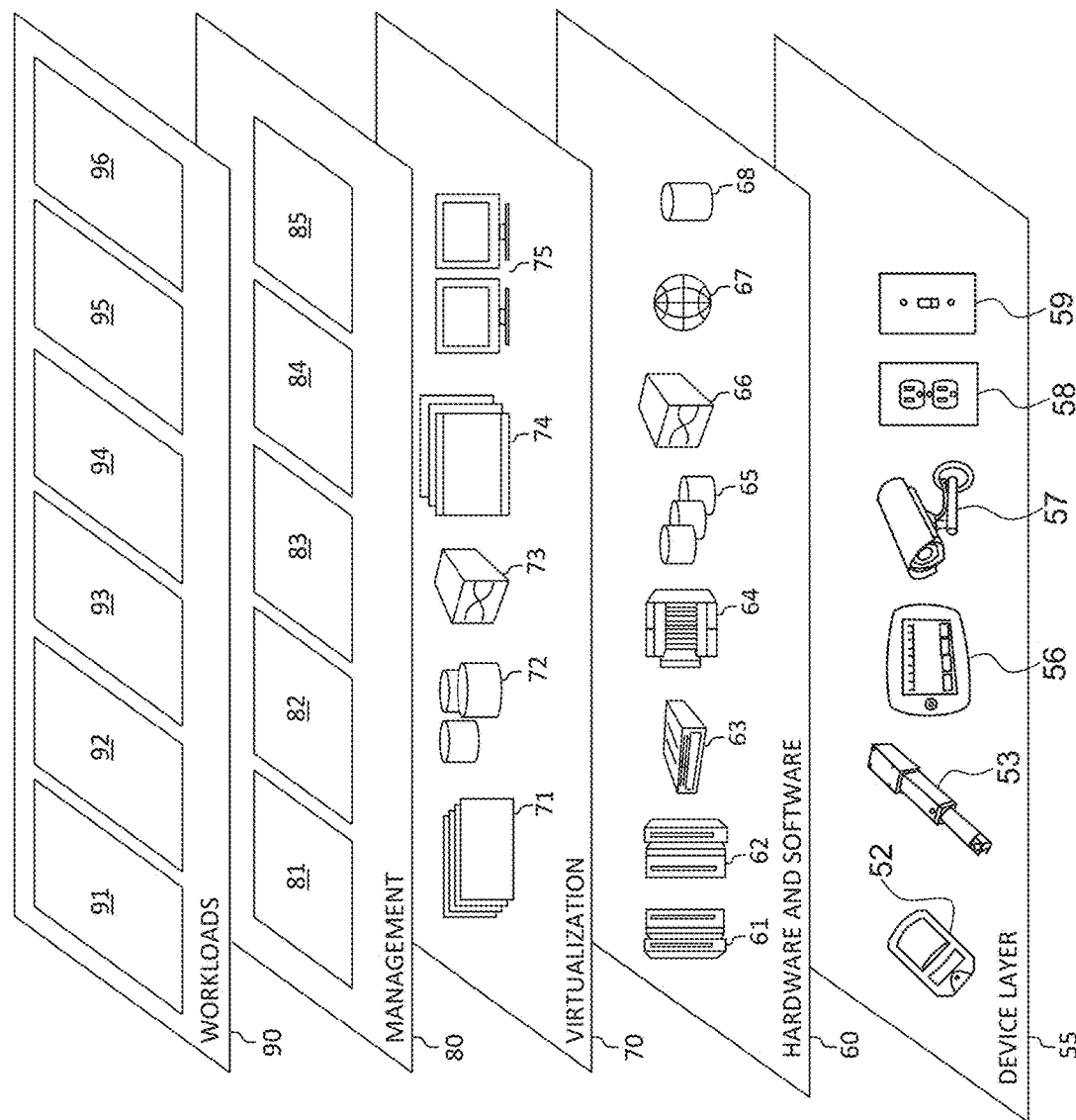
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing the utilization of software releases, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide systems and/or methods that provide for automated monitoring and analysis of, for example, feedback provided by early adopters of software releases via online channels. Depending on the apparent severity of the issues raised in the feedback, utilization of the software release (e.g., dependency update) may be delayed (or entirely prevented), allowing time for a manual response (e.g., by appropriate personnel). For example, in some embodiments, the systems (and/or methods) described herein utilize natural language processing techniques (e.g., a NLP topic model) to automatically track designated reporting fora (e.g., an online forum) to delay the incorporation of dependencies (or other software releases) until they have been vetted by early adopters. That is, if a dependency is detected as having issues, as indicated by feedback (or other commentary, communications, etc.) left by early adopters, the utilization of the dependency may be at least delayed for some time (e.g., a few days), giving the developers time to correct the problem(s).

For example, consider a software dependency D, of which a new version is released on a particular night. A user (e.g., a software developer) has an automatic software build scheduled for the next morning, which has been configured to utilize the most release of D. In some embodiments, the system checks the issue reporting website (or webpage) for the dependency and finds the following at the start of an issue posted by an early adopter: "I don't know what this is, but it looks very suspicious to me—it looks like a virus. The URL it attempts to load is http://pastebin.com/asdflkj/skhh. Also it attempts to send my .npmrc somewhere."

In some embodiments, a natural language topic model is utilized, which has been trained on known high-severity issues published on previous unpublished artifacts. In one embodiment, the topic model is as simple as a unigram model on tokens. As another example, the topic model may consist of a more sophisticated word frequency model.

Regardless of the exact natural language processing technique utilized, in some embodiments, a severity score (or grade) (S) is calculated (or determined) for the issue (and/or the software release). In some embodiments, a numerical (severity) value or score may be calculated (e.g., on any suitable scale using positive and/or negative numbers) and/or a descriptive grade (e.g., "high," "low," etc.) may be generated (or determined). As one particular example, the severity score may be calculated as being between 0 and 1 (i.e., greater than or equal to 0 and less than or equal to 1), such as 0.1, 0.4, 0.8 etc.), where 1 indicates an extremely severe problem and 0 indicates little (or no) concern. As mentioned above, in some embodiments, cognitive profiles of the early adopters may be utilized to weight their feedback, comments, etc. regarding software releases.

In some embodiments, a time to utilize the software release (or a "pull time") is determined based on the severity score. For example, the severity score may be multiplied by a tuning factor (T). The tuning factor may be determined as the delay that should be utilized before incorporating the software release if the software release is determined to have a very severe issue (e.g., a severity score of 1), and may be (re)configurable (e.g., via user preferences, system settings, etc.). For example, if a tuning factor of 72 (i.e., which may be associated with 72 hours) is used, and the severity score is 1, the time to utilize the software release (and/or the delay before utilizing the software release) may be 72 hours (i.e., 1×72). However, if the severity score is 0.5, the time to utilize the software release may be 36 hours (i.e., 0.5×72).

As such, if issue(s) is determined to be relatively minor, the software release may be utilized relatively promptly (e.g., a few hours after being published/released). However, if the issue is determined to be relatively severe, the software release may not be utilized for several days (or perhaps even weeks, months, etc.). With respect to the example provided above, the system may determine the severity score to be relatively high (e.g., 0.8-1) because of the inclusion of the terms "suspicious," "virus," and "pastebin," and as such, depending on the tuning factor using, utilization of the software may be delayed for several days, the development team that released it enough time to take corrective action. In contrast, if the severity score is determined to be relatively low (e.g., 0) (and/or no indications of issues/problems are found), there may be no delay in the utilization of the software release (i.e., 0×72).

In some embodiments, if the calculated severity score (or grade) exceeds a predetermined threshold (e.g., greater than 0.9), the software release is prevented from being utilized altogether. That is, if the calculated severity score is sufficiently high, the system may not implement a delay before utilizing the software release but rather simply prevent the use of the software release indefinitely and/or at least until a later release is published. Additionally, in some embodiments, if the software release was recently published, and little or no information is available regarding it (e.g., no commentary/feedback has been provided by early adopters), the system may incorporate a delay (e.g., 24 hours) to allow for testing by early adopters.

For example, consider a scenario in which a system (and/or method) according to the embodiments described herein is utilized. A software release (e.g., a dependency update), such as "dependency D version 1.2.3," is published (or released, made available, etc.) on a particular day at a particular time in the central United States (e.g., Monday at 6 P.M. local time). Ten hours later, a user (e.g., an early adopter, test user, etc.) in South Korea notices suspicious network activity transmitting credentials to an unknown website and traces it to the recent dependency update. Thirty minutes later, the user opens a strongly worded issue or thread on a web-based issue reporting page associated with the dependency update (i.e., the location of which is available in the metadata of D).

At 6 P.M. the next day (e.g., in the central United States), a scheduled automated build of software product P begins. Rather than automatically pulling (or utilizing) the most recent version of D (e.g., version 1.2.3) (e.g., via dependency management software), the issue page (e.g., an online forum, website, etc.) is evaluated by the system (and/or a cognitive module). As one example, assume that because of the type of language found on the topic page, a severity score of 0.8 is calculated for the latest version of D, which is indicative of a high probability of a major issue. The severity score is multiplied by the appropriate tuning factor (e.g., 60 hours), which results in a time (or delay) to utilize the release of 48 hours (i.e., 0.8×60). As such, the system prevents version 1.2.3 from being utilized until Wednesday at 6 P.M. (i.e., if the delay is calculated from the time of the initial release of the software, which may be a configurable setting). In the meantime, in this particular example, a previous version of D (e.g., version 1.2.2) is utilized for the software build.

Approximately one our later, the developers of D begin to investigate the issue as reported on the web-based issue reporting page. After another hour has passed, the developers realize that a security breach has indeed occurred and begin the process to unpublish version 1.2.3. One hour later, the internally-used credentials of product P are safe because the build utilized D version 1.2.2, and another hour later, D version 1.2.3 is successfully unpublished. 9.

Continuing with this scenario, if another automated build begins several days later (and before any republication of version 1.2.3 or another new version), the most recent version of D available is 1.2.2 because version 1.2.3 has been unpublished. If that was not the case, version 1.2.3 would have again been pulled and used for the build (i.e., at least initially but the method described above may be performed to discover the potential issue(s) with version 1.2.3).

Figure 4:
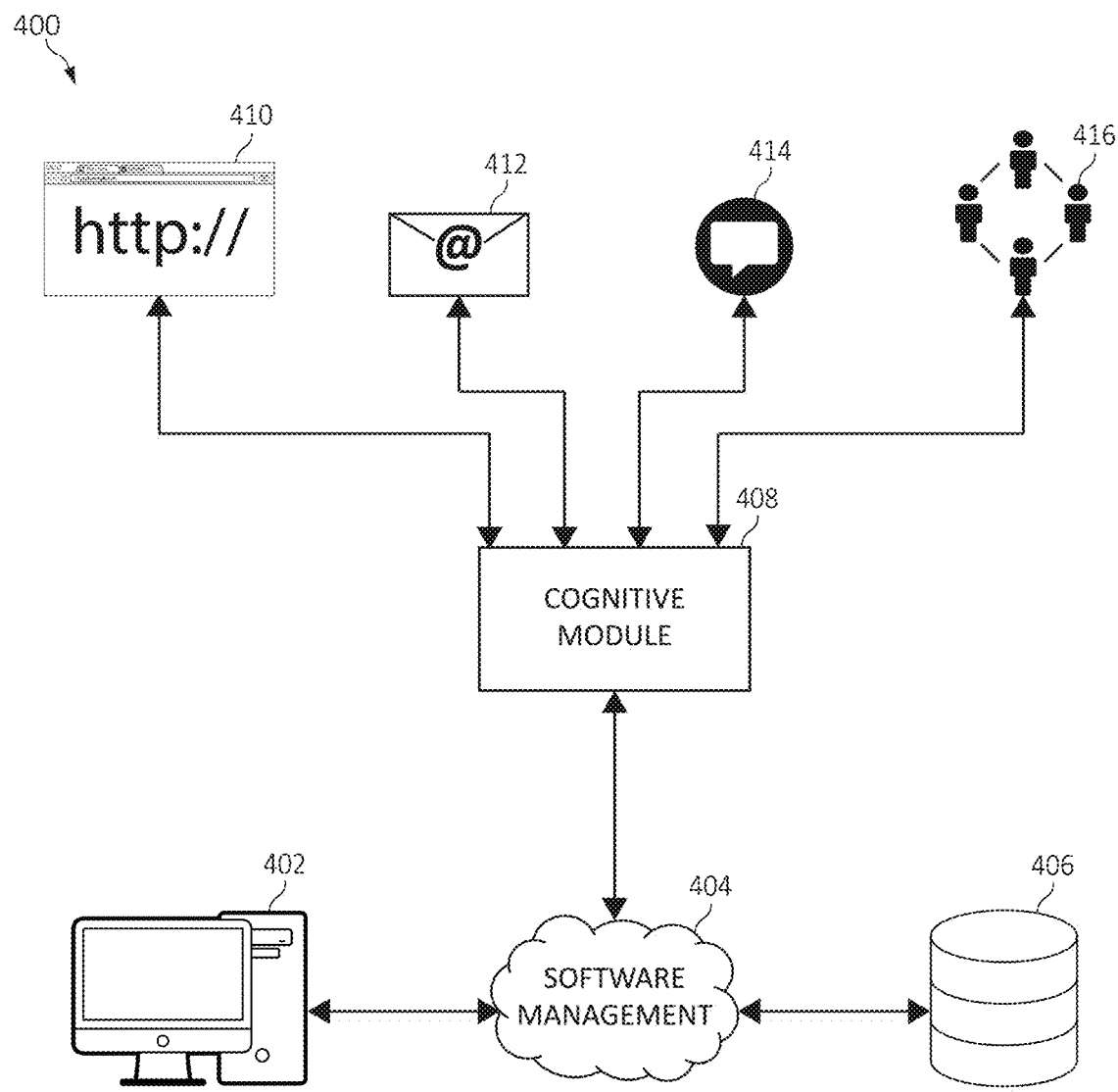
FIG. 4 is a block diagram a computing environment according to an embodiment of the present invention.

FIG. 4 illustrates an exemplary computing environment 400 according to some embodiments of the present invention. In the depicted environment, the computing environment 400 includes a computing device 402, a software management tool 404, a database 406, and a cognitive module 408. The computing device (or node) 402 may be any suitable computing device, such as those described above, through on which various types of software may be utilized by a user and/or automated system. The software management tool 404 may include any suitable software (and/or computing device) for managing the updating and/or building of software (e.g., dependency management software), as is commonly understood. The database 406 may include any suitable memory device(s) on which software components (e.g., software releases) are stored, which may be accessed (or "pulled" or downloaded) by the software management tool 404.

The cognitive module 408 may include (and/or be implemented with) any suitable computing device or system, such as those described above, and may be configured to perform the management of the utilization of software releases described herein (e.g., perhaps in combination with the software management tool 404 and/or the computing device 402). In some embodiments, the computing device 402, the software management tool 404, and/or the cognitive module 408 may be integrated into common computing devices and/or located locally. For example, the cognitive module 408 may be integrated with the computing device 402 and/or the software management tool 404. However, in some embodiments, the components shown in FIG. 4 may be remote from each other and in operable communication via any suitable communication network (e.g., the Internet).

As one example of functionality performed within the environment 400, the computing device 402 may provide a request to the software management tool 404 to update a software component, create a software build, etc. (or may initiate such a command internally). In some embodiments, when such a request is generated, rather than immediately search the database 406 for the most recent release of the appropriate software component, the software management tool 404 utilizes the cognitive module 408 to determine whether or not to utilize the most recent version of the software component, as described above.

For example, the cognitive module 408 may have access to various data (or information) sources associated with one or more software release (e.g., a software dependency) and/or early adopters of the software release(s). In the example shown, the data sources include webpages (e.g., issue reporting pages) 410, emails 412, text messages (and/or chat content) 414, and social media activity 416. As such, it should be understood that in at least some embodiments described herein, the data sources associated with the software release(s) are not limited to webpages on which early adopters post comments, etc. regarding the performance, problems, issues, etc. of the software releases but may also include other online channels through which various types of communications/content are sent.

As described above, the cognitive module 408 may search the data sources 410-416 for information related to the particular software release in question, calculate a severity score (e.g., using natural language processing techniques), and determine a time to utilize the software release (and/or a delay before the software release is utilized). With continued use and/or feedback provided by users, the performance of the system may be improved over time.

Figure 5:
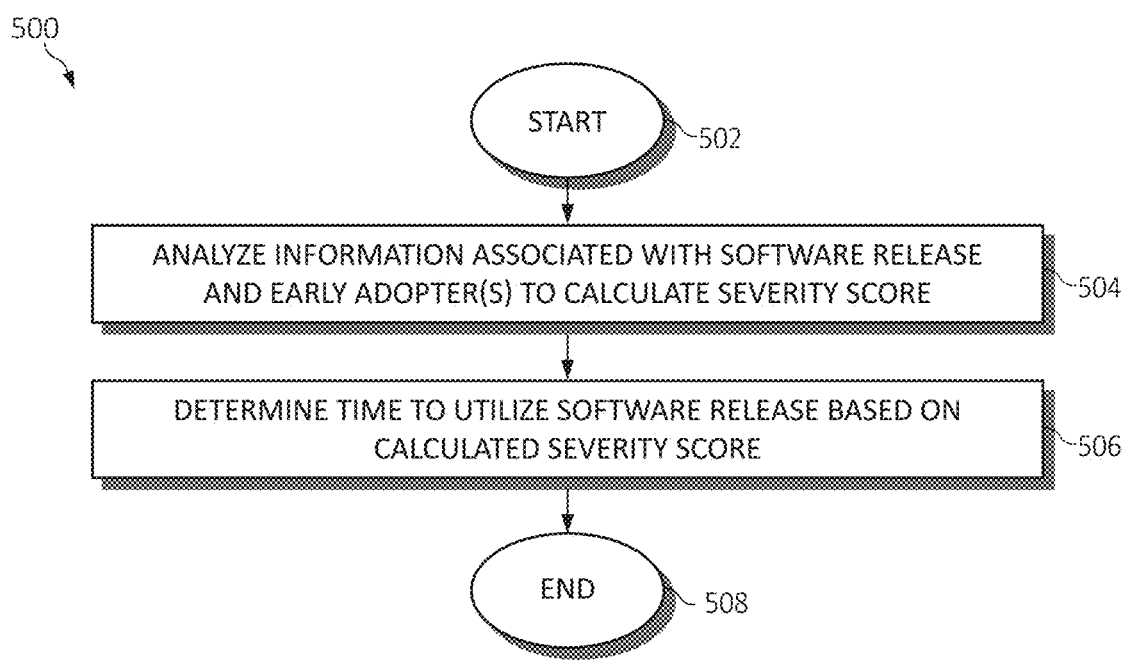
FIG. 5 is a flowchart diagram of an exemplary method for managing the utilization of software releases according to an embodiment of the present invention.

Turning to FIG. 5, a flowchart diagram of an exemplary method 500 for managing the utilization of software releases, by one or more processors, is provided. The method 500 begins (step 502) with, for example, information (or data) sources associated with software releases (e.g., software dependencies) and/or at least one early adopter of the software releases being made accessible and/or monitored by a cognitive module and/or the publication of a particular software release occurring. The data sources may include feedback provided by the early adopter(s) via online channels (e.g., webpages for reporting issues, emails, social media activity, text messages, messaging/chat applications, etc.).

The information associated with the software release and at least one early adopter of the software release is analyzed to calculate a severity score for the software release (step 504). The analyzing of the information associated with the software release and the at least one early adopter may be performed utilizing a cognitive analysis and/or a natural language processing technique. For example, in some embodiments, a natural language topic model is utilized, which has been trained on known high-severity issues published on previous unpublished artifacts. In one embodiment, the topic model is as simple as a unigram model on tokens. As another example, the topic model may consist of a more sophisticated word frequency model.

Based on the analysis of the information, a severity score (or grade) may be calculated (or determined) for the software release. In some embodiments, a numerical (severity) value or score may be calculated (e.g., on any suitable scale using positive and/or negative numbers) and/or a descriptive grade (e.g., "high," "low," etc.) may be generated (or determined). As one particular example, the severity score may be calculated as being between 0 and 1 (i.e., greater than or equal to 0 and less than or equal to 1), such as 0.1, 0.4, 0.8 etc.), where 1 indicates an extremely severe problem and 0 indicates little (or no) concern. In some embodiments, if the severity score (or grade) exceeds a predetermined threshold (e.g., greater than 0.9), the software release is prevented from being utilized altogether (e.g., an updated version of the software is not utilized until a later release is published).

A time to utilize the software release (and/or a delay to be implemented before the software release is utilized) is determined based on the calculated severity score (step 506). The determining of the time to utilize the software release may include multiplying the calculated severity score by a configurable tuning factor. For example, if a tuning factor of 72 (i.e., which may be associated with 72 hours/three days) is used, and the severity score is 1, the time to utilize the software release (and/or the delay before utilizing the software release) may be 72 hours (i.e., 1×72). However, if the severity score is 0.5, the time to utilize the software release may be 36 hours (i.e., 0.5×72).

Method 500 ends (step 508) with, for example, the software release being utilized (e.g., for an automated software build) after the determined time (or delay) has passed, as described above. As such, the system provides the developers of the software release time to correct issues or problems before the software release is utilized by users (i.e., other than early adopters). In some embodiments, feedback from users (e.g., early adopters and/or later uses) may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing the utilization of software releases, by a processor, comprising:
   executing machine learning logic to train a topic model using examples selected from known high-severity issues published on previous unpublished artifacts associated with historical software releases;
   analyzing, utilizing the trained topic model, information associated with a software release and at least one early adopter of the software release to calculate a severity score for the software release, wherein the information associated with the software release is obtained through at least one online forum containing reviews of the software release respectively created by a plurality of the early adopters, wherein the information associated with the at least one early adopter includes user information contained in a user profile, and wherein the severity score is determined according to weights respectively applied to the reviews based on the user information in the user profile of each of the plurality of early adopters creating the reviews; and
   determining a time to utilize the software release based on the calculated severity score.

2. The method of claim 1, wherein the determining of the time to utilize the software release comprises preventing the software release from being utilized if the calculated severity score exceeds a predetermined threshold.

3. The method of claim 1, further comprising causing the software release to be utilized at the determined time.

4. The method of claim 1, wherein the determining of the time to utilize the software release comprises multiplying the calculated severity score by a configurable tuning factor.

5. The method of claim 1, wherein the information associated with the software release and the at least one early adopter of the software release includes feedback provided by the at least one early adopter on an online channel.

6. The method of claim 1, wherein the analyzing of the information associated with the software release and the at least one early adopter is performed utilizing a cognitive analysis.

7. The method of claim 1, wherein the analyzing of the information associated with the software release and the at least one early adopter is performed utilizing a natural language processing technique.

8. A system for managing the utilization of software releases comprising:
   a processor executing instructions stored in a memory device, wherein the processor:
      executes machine learning logic to train a topic model using examples selected from known high-severity issues published on previous unpublished artifacts associated with historical software releases;
      analyzes, utilizing the trained topic model, information associated with a software release and at least one early adopter of the software release to calculate a severity score for the software release, wherein the information associated with the software release is obtained through at least one online forum containing reviews of the software release respectively created by a plurality of the early adopters, wherein the information associated with the at least one early adopter includes user information contained in a user profile, and wherein the severity score is determined according to weights respectively applied to the reviews based on the user information in the user profile of each of the plurality of early adopters creating the reviews; and determines a time to utilize the software release based on the calculated severity score.

9. The system of claim 8, wherein the determining of the time to utilize the software release comprises preventing the software release from being utilized if the calculated severity score exceeds a predetermined threshold.

10. The system of claim 8, wherein the processor further causes the software release to be utilized at the determined time.

11. The system of claim 8, wherein the determining of the time to utilize the software release comprises multiplying the calculated severity score by a configurable tuning factor.

12. The system of claim 8, wherein the information associated with the software release and the at least one early adopter of the software release includes feedback provided by the at least one early adopter on an online channel.

13. The system of claim 8, wherein the analyzing of the information associated with the software release and the at least one early adopter is performed utilizing a cognitive analysis.

14. The system of claim 8, wherein the analyzing of the information associated with the software release and the at least one early adopter is performed utilizing a natural language processing technique.

15. A computer program product for managing the utilization of software releases, by a processor, the computer program product embodied on a non-transitory computer-readable storage medium having computer-readable program code portions stored therein, the computer-readable program code portions comprising:

an executable portion that executes machine learning logic to train a topic model using examples selected from known high-severity issues published on previous unpublished artifacts associated with historical software releases;

an executable portion that analyzes, utilizing the trained topic model, information associated with a software release and at least one early adopter of the software release to calculate a severity score for the software release, wherein the information associated with the software release is obtained through at least one online forum containing reviews of the software release respectively created by a plurality of the early adopters, wherein the information associated with the at least one early adopter includes user information contained in a user profile, and wherein the severity score is determined according to weights respectively applied to the reviews based on the user information in the user profile of each of the plurality of early adopters creating the reviews; and an executable portion that determines a time to utilize the software release based on the calculated severity score.

16. The computer program product of claim 15, wherein the determining of the time to utilize the software release comprises preventing the software release from being utilized if the calculated severity score exceeds a predetermined threshold.

17. The computer program product of claim 15, wherein the computer-readable program code portions further include an executable portion that causes the software release to be utilized at the determined time.

18. The computer program product of claim 15, wherein the determining of the time to utilize the software release comprises multiplying the calculated severity score by a configurable tuning factor.

19. The computer program product of claim 15, wherein the information associated with the software release and the at least one early adopter of the software release includes feedback provided by the at least one early adopter on an online channel.

20. The computer program product of claim 15, wherein the analyzing of the information associated with the software release and the at least one early adopter is performed utilizing a cognitive analysis.

21. The computer program product of claim 15, wherein the analyzing of the information associated with the software release and the at least one early adopter is performed utilizing a natural language processing technique.

* * * * *